(12) United States Patent
Simoncelli et al.

(10) Patent No.: US 10,459,746 B2
(45) Date of Patent: Oct. 29, 2019

(54) RESUMING A PAUSED VIRTUAL MACHINE

(71) Applicant: Red Hat Israel, Ltd., Raanana (IL)

(72) Inventors: Federico Simoncelli, Fano (IT); Yeela Kaplan, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/192,678

(22) Filed: Feb. 27, 2014

(65) Prior Publication Data
US 2015/0242232 A1 Aug. 27, 2015

(51) Int. Cl.
*G06F 9/455* (2018.01)

(52) U.S. Cl.
CPC ............ *G06F 9/45558* (2013.01); *G06F 2009/45575* (2013.01)

(58) Field of Classification Search
CPC .............. G06F 9/45558; G06F 2009/45575
USPC ................................................... 718/1
See application file for complete search history.

(56) References Cited

U.S. PATENT DOCUMENTS

| | | | | |
|---|---|---|---|---|
| 8,549,210 B2* | 10/2013 | Hunter et al. | | 711/6 |
| 8,819,369 B1* | 8/2014 | Alappat | G06F 17/30088 | 707/640 |
| 9,329,947 B2* | 5/2016 | Elyashev | G06F 11/1484 | |
| 9,600,774 B1* | 3/2017 | Biemueller | G06F 9/45533 | |
| 2009/0094318 A1* | 4/2009 | Gladwin | H04L 67/1097 | 709/203 |
| 2010/0036851 A1* | 2/2010 | Paterson-Jones | G06F 3/0619 | 707/636 |
| 2010/0235835 A1* | 9/2010 | Nishiguchi | G06F 9/485 | 718/1 |
| 2011/0066786 A1* | 3/2011 | Colbert | G06F 9/45558 | 711/6 |
| 2011/0196968 A1* | 8/2011 | Kobayashi et al. | | 709/226 |
| 2011/0314470 A1* | 12/2011 | Elyashev | G06F 11/1484 | 718/1 |
| 2013/0055261 A1* | 2/2013 | Han et al. | | 718/1 |
| 2014/0164723 A1* | 6/2014 | Garthwaite | G06F 12/16 | 711/162 |
| 2014/0173196 A1* | 6/2014 | Beveridge | G06F 3/061 | 711/114 |
| 2014/0173594 A1* | 6/2014 | Ng et al. | | 718/1 |
| 2014/0366019 A1* | 12/2014 | Bajaj | G06F 9/461 | 718/1 |

OTHER PUBLICATIONS

Knauth et al, "Fast Virtual Machine Resume for Agile Cloud Services", [Online], 2013, pp. 127-134, [Retrieved from internet on Jun. 8, 2019], <https://ieeexplore.ieee.org/stamp/stamp.jsp?tp=&arnumber=6686019> (Year: 2013).*

(Continued)

*Primary Examiner* — Ziaul A Chowdhury
*Assistant Examiner* — Zengpu Wei
(74) *Attorney, Agent, or Firm* — Womble Bond Dickinson (US) LLP; Daniel E. Ovanezian

(57) ABSTRACT

A host in a virtualization system pings one or more storage domains. When the host determines that a storage domain in inaccessible and later determines that the storage domain is once again accessible, the host may determine a set of virtual machines associated with the storage domain that are paused. The host may, then, resume at least one of those virtual machines.

14 Claims, 4 Drawing Sheets

(56) References Cited

OTHER PUBLICATIONS

Sotomayor et al, "Resource Leasing and the Art of Suspending Virtual Machines", [Online], 2009, pp. 1-10, [Retrieved from internet on Jun. 8, 2019], <http://people.cs.uchicago.edu/~borja/pubs/hpcc09-sotomayor.pdf> (Year: 2009).*

Park et al, "Fast and Space-Efficient Virtual Machine Checkpointing", [Online], 2011, pp. 75-85, [Retrieved from internet on Jun. 8, 2019], <http://delivery.acm.org/10.1145/1960000/1952694/p75-park.pdf> (Year: 2011).*

* cited by examiner

RESUMING A PAUSED VIRTUAL MACHINE

TECHNICAL FIELD

Embodiments of the present invention relate to management of virtual machines.

DESCRIPTION OF THE RELATED ART

When a virtual machine is running and encounters an I/O problem, the hypervisor automatically pauses the virtual machine. The virtual machine may be manually resumed when the problem is resolved.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are systems and methods for managing a set of virtual machines. When a virtual machine is running and encounters an I/O problem, the host automatically pauses the virtual machine. When the I/O problem is resolved, the host automatically resumes the virtual machine. Thus, manual restarting of the virtual machine (and the associated time taken to perform this task) is avoided. Further, the virtual machine can more quickly resume the performance of assigned tasks.

Figure 1:
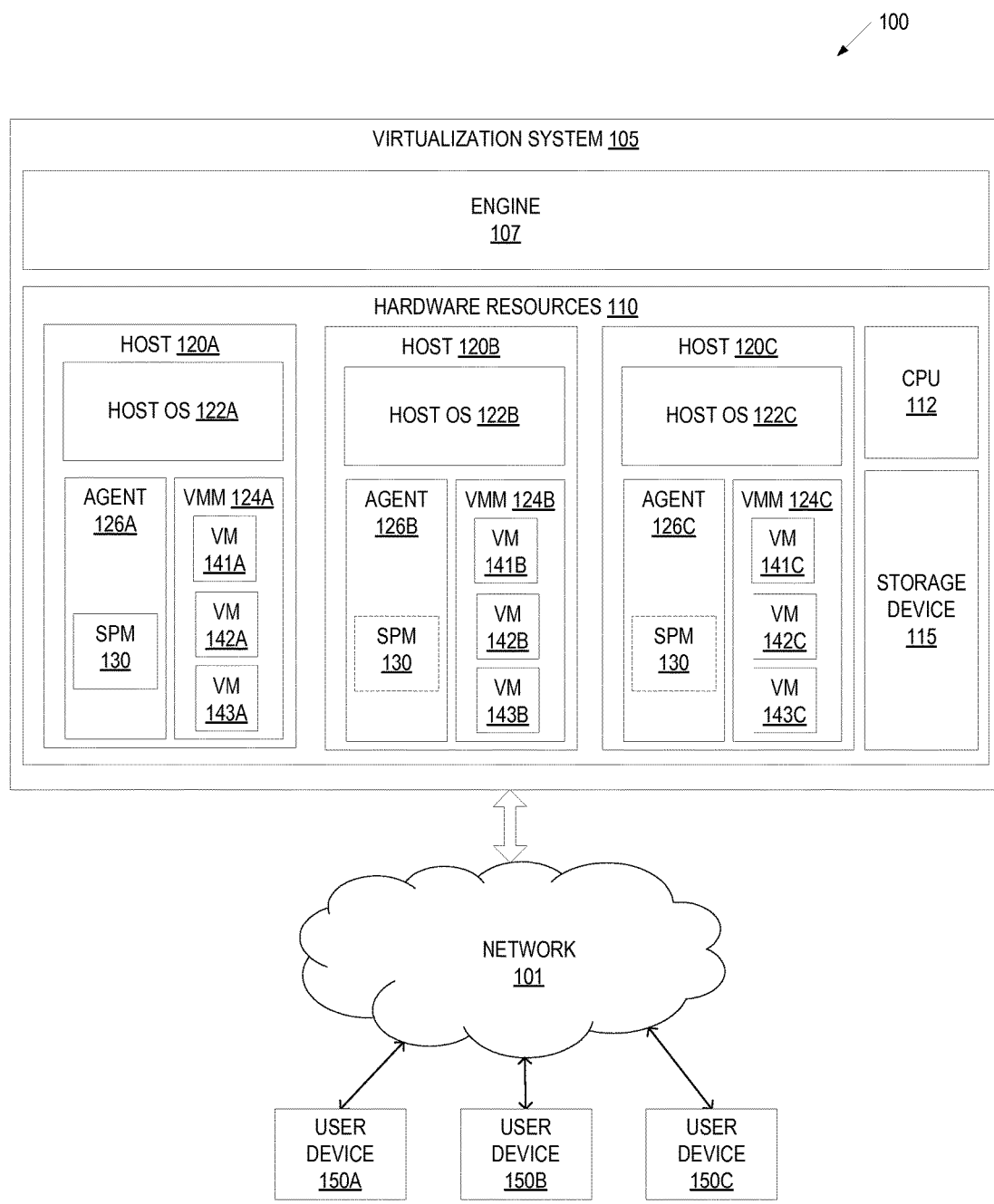
FIG. 1 is a block diagram of an example network architecture in which implementations of the present disclosure can operate.

FIG. 1 is a block diagram of an embodiment of a network architecture 100. The network architecture 100 includes a virtualization system 105 coupled to and accessible over a network 101 by a number of user devices 150A-150C. The virtualization system 105 includes a variety of hardware resources 110 which may include, for example, desktop computers, laptop computers, rackmount servers, routers, switches, tablet computers, mobile phones, or any other type of computing device. The hardware resources 110 may include one or more processing devices, memory, and/or additional devices such as a graphics card, hardware RAID controller, network controller, hard disk drive, universal serial bus (USB) device, internal input/output (I/O) device, keyboard, mouse, speaker, etc. The hardware resources 110 may be used to execute software, including one or more operating systems, virtual machines, or other applications. The virtualization system also includes an engine 107 (which may execute on a portion of the hardware resources 110 or a separate engine device) that manages the hardware resources 110 and the processes running on the hardware resources 110.

The hardware resources 110 include a number of hosts 120A-120C (or host machines) each including a portion of the hardware resources 110. The hosts 120A-120C may each include one or more processing devices and one or more storage devices. The hardware resources 110 may further include one or more additional processing devices 112 and one or more additional storage devices 115.

Each of the hosts 120A-120C includes a kernel space and a user space defined by the hardware resources of the host 120A-120C. A host operating system (OS) 122A-122C is executed in the kernel space of the host 120A-120C. The host OS 122A-122C allows a host 120A-120C to make its hardware resources available to virtual machines 141A-143C which may be executed in the user space.

Each of the hosts 120A-120C may execute a virtual machine monitor (VMM) 124A-124C (or a hypervisor). The VMM 124A-124C is an application that executes on a host 120A-120C to manage virtual machines 141A-143C. In particular, the VMM 124A-124C can instantiate or dismiss virtual machines 141A-143C, pause or resume virtual machines 141A-143C, or configure virtual machines 141A-143C for various versions or operating systems. The VMM 124A-124C may include a virtualization API and a multi-platform emulator. Each virtual machine 141A-143C may execute a guest operating system that can be accessed by a user device 150A-150C over the network 101. Each virtual machine 141A-143C may further run guest applications using the guest operating system.

Each of the hosts 120A-120C includes an agent 126A-126C. The agent 126A-126C may facilitate inter-host communication and perform various monitoring and administrative tasks. The agent 126A-126C may also include functionality for acting as a storage pool manager (SPM) 130. However, only one of the hosts 120A is active as the SPM at any one time. The host 120A may be designated an active SPM 130 by the engine 107. The SPM 130 coordinates metadata changes in the virtualization system 105, such as creating and deleting disk images, creating and merging snapshots, copying images between storage domains, creating templates and storage allocation for block devices of the hardware resources 110 such as hard drives or other storage devices.

A storage domain is a collection of data structures that have a common storage interface. A storage domain may contain complete images of templates and virtual machines (including snapshots). A storage domain may comprise one or more block devices, one or more storage devices, one or more file systems, one or more volumes, and/or portions thereof.

When a virtual machine 141A-143C is running and encounters an I/O problem the virtual machine 141A-143C is paused. For example, when operation of a virtual machine 141A-143C requires a VMM 124A-124C to access a storage domain that is inaccessible, the VMM 124A-124C may pause the virtual machine 141A-143C.

The agent 126A-126C may monitor the state of storage domains to determine whether virtual machines 141A-143C should be resumed. In particular, if the agent 126A-126C determines that a storage domain is inaccessible and later determines that the storage domain is again accessible, the agent 126A-126C may identify one or more virtual machines that have been paused by the inaccessibility and resume them (or instruct the VMM 124A-124C to resume them).

Figure 2:
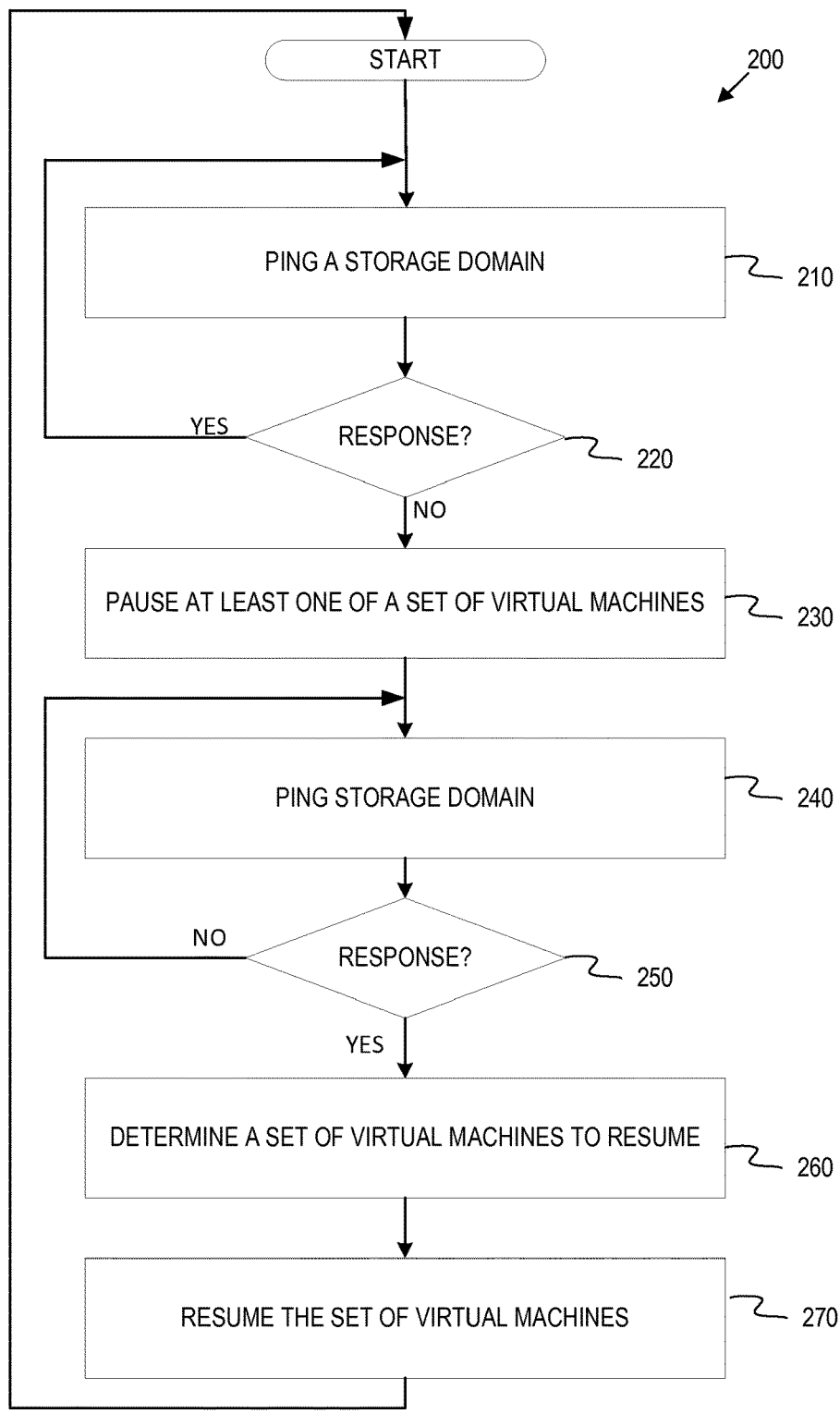
FIG. 2 is a flow diagram of a method of managing a set of virtual machines.

FIG. 2 is a flow diagram of a method 200 of managing a set of virtual machines. The method 200 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, the method 200 may be performed, in part, by processing logic of the host 120A-120C described above with respect to FIG. 1.

For simplicity of explanation, the method 200 is depicted and described as a series of acts. However, acts in accordance with this disclosure can occur in various orders and/or concurrently and with other acts not presented and described herein. Furthermore, not all illustrated acts may be performed to implement the method 200 in accordance with the disclosed subject matter. In addition, those skilled in the art will understand and appreciate that the method 200 could alternatively be represented as a series of interrelated states via a state diagram or events.

It is to be appreciated that the method 200 may be performed by a host for any number of storage domains simultaneously, concurrently (partially overlapping in time), or consecutively. Similarly, the method 200 may be performed by any number of hosts in a virtualization system. However, for ease of reference, the method 200 is described for a single storage domain and a single host.

At block 210 of method 200, processing logic pings a storage domain. Pinging the storage domain may include sending a request to the storage domain for a response (e.g., a ping). Pinging a storage domain may include attempting to access at least a portion of the storage domain, e.g., a file stored in the storage domain.

At block 220, the processing logic determines if a response was received within a specified amount of time. If a response is received within the time period corresponding to the specified amount of time, the method 200 returns to block 210 where the processing logic, again, pings the storage domain. If a response is not received within the time period, the method 200 moves to block 240 where the processing logic pings the storage domain at a later time. One or more running virtual machines associated with the storage domain may be paused when the storage domain is inaccessible.

In one embodiment, at block 230, if a response is not received within the time period, the processing logic pauses one or more virtual machines associated with the storage domain in response to determining that the storage domain is inaccessible. The processing device may further record that the one or more virtual machines has been paused in response to determining that the storage domain is inaccessible.

At block 240, the processing logic pings the storage domain. The processing logic may ping the storage domain as described above with respect to block 210. At block 250, the processing logic determines if a response was received within a specified amount of time. The specified amount of time may be the same or different from the specified amount of time in block 220. If a response is not received with the time period corresponding to the specified amount of time, the method 200 returns to block 240 where the processing logic, again, pings the storage domain. If a response is received within the time period, the method moves to blocks 260 and 270 where the processing logic causes a set of virtual machines to be resumed (or unpaused or restarted).

At block 260, in response to receiving a response in block 250, the processing logic determines a set of virtual machines to resume. The set of virtual machines may be a subset (which may be the entire set or be a proper subset) of the one or more virtual machines paused in block 230. The processing logic may determine the set of virtual machines to resume in a number of ways.

In one embodiment, the processing logic determines the set of virtual machines to be resumed by determining a first set of virtual machines that are paused (for any reason). Then, the processing logic determines a second set of virtual machines that includes virtual machines in the first set that are associated with the storage domain. The processing logic may determine a third set of virtual machines that includes virtual machines in the second set that are not associated with other storage domains that are inaccessible. The processing logic may determine a fourth set of virtual machines that includes virtual machines in the third set that are not paused for reasons other than an I/O problem (e.g., that are not paused by a user).

In another embodiment, the processing logic determines a first set of virtual machines that are associated with the storage domain. Then, the processing logic determines a second set of virtual machines that includes the virtual machines in the first set that are paused because of an I/O problem, but not for reasons other than an I/O problem. In such an embodiment, the processing logic may exclude or include those virtual machines associated with other inaccessible storage domains. If the set includes virtual machines associated with other inaccessible storage domains and such a virtual machine is resumed, it will be automatically re-paused (e.g., in block 230).

In one embodiment, the processing logic stores a record of the one or more virtual machines paused in block 220 and determines the set of virtual machines as the one or more virtual machines stored in the record.

In block 270, the processing logic resumes the virtual machines in the set of virtual machines. In one embodiment, the processing logic resumes the virtual machines by submitting instructions to a hypervisor to resume the virtual machines.

Figure 3:
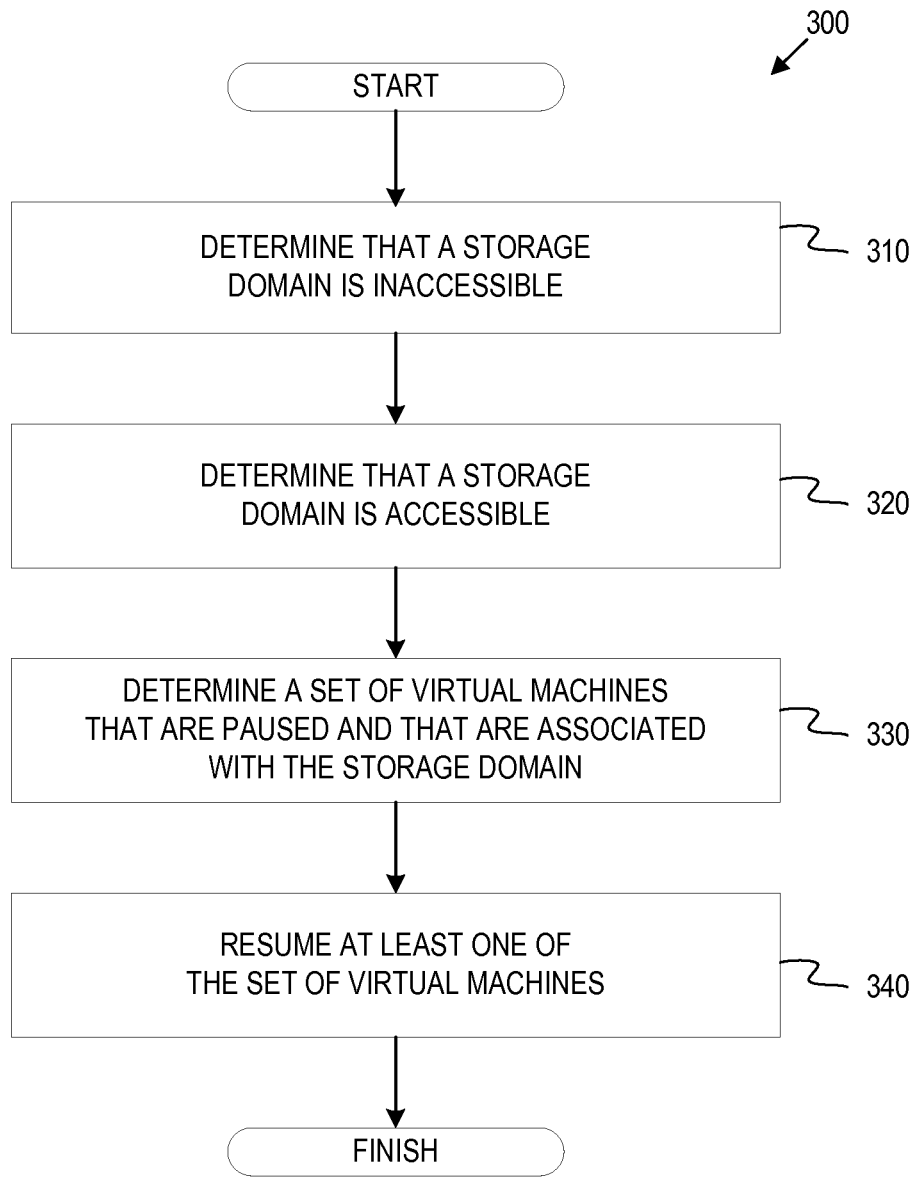
FIG. 3 is a flow diagram of a method of resuming a virtual machine.

FIG. 3 is a flow diagram of a method 300 of resuming a virtual machine. The method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, the method 300 may be performed, in part, by processing logic of the host 120A-120C described above with respect to FIG. 1. In particular, the method 300 may be performed by the SPM 130.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

It is to be appreciated that the method 300 may be performed by a host for any number of storage domains simultaneously, concurrently (partially overlapping in time), or consecutively. Similarly, the method 300 may be performed by any number of hosts in a virtualization system. However, for ease of reference, the method 300 is described for a single storage domain and a single host.

At block 310 of method 300, the processing logic determines that a storage domain is inaccessible. The processing logic may determine that a storage domain is inaccessible by sending a ping to the storage domain and failing to receive a response within a predetermined amount of time. At block 320, the processing logic determines that the storage domain is accessible. The processing logic may determine that the storage domain is accessible by sending a ping to the storage domain and receiving a response within a predetermined amount of time (which may be the same or different from the predetermined amount of time of block 310).

Because the storage domain was, for a time, inaccessible (as determined in block 310), one or more virtual machines associated with the storage domain may have been automatically paused (e.g., by the processing logic or other logic).

At block 330, the processing logic determines a set of virtual machines that are paused and that are associated with the storage domain. In one embodiment, the processing logic determines one or more virtual machines that are paused and determines which of those virtual machines are associated with the storage domain. In another embodiment, the processing logic determines one or more virtual machines that are associated with the storage domain and determines which of those virtual machines are paused.

At block 340, the processing logic resumes at least one virtual machine of the set of virtual machines. In one embodiment, the processing logic resumes all of the virtual machines of the set of virtual machines. In another embodiment, the processing logic resumes less than all of the virtual machines of the set of virtual machines.

The processing logic may determine, for each of the virtual machines in the set of virtual machine, whether to resume the virtual machine and resume the virtual machines so determined. The processing logic may determine whether to resume a virtual machine based on the reason the virtual machine was paused. For example, the processing logic may determine to resume a virtual machine that was paused for an I/O problem, but determine not to resume a virtual machine that was paused by a user. The processing logic may determine to resume a virtual machine only when all storage domains associated with the virtual machine are accessible.

Figure 4:
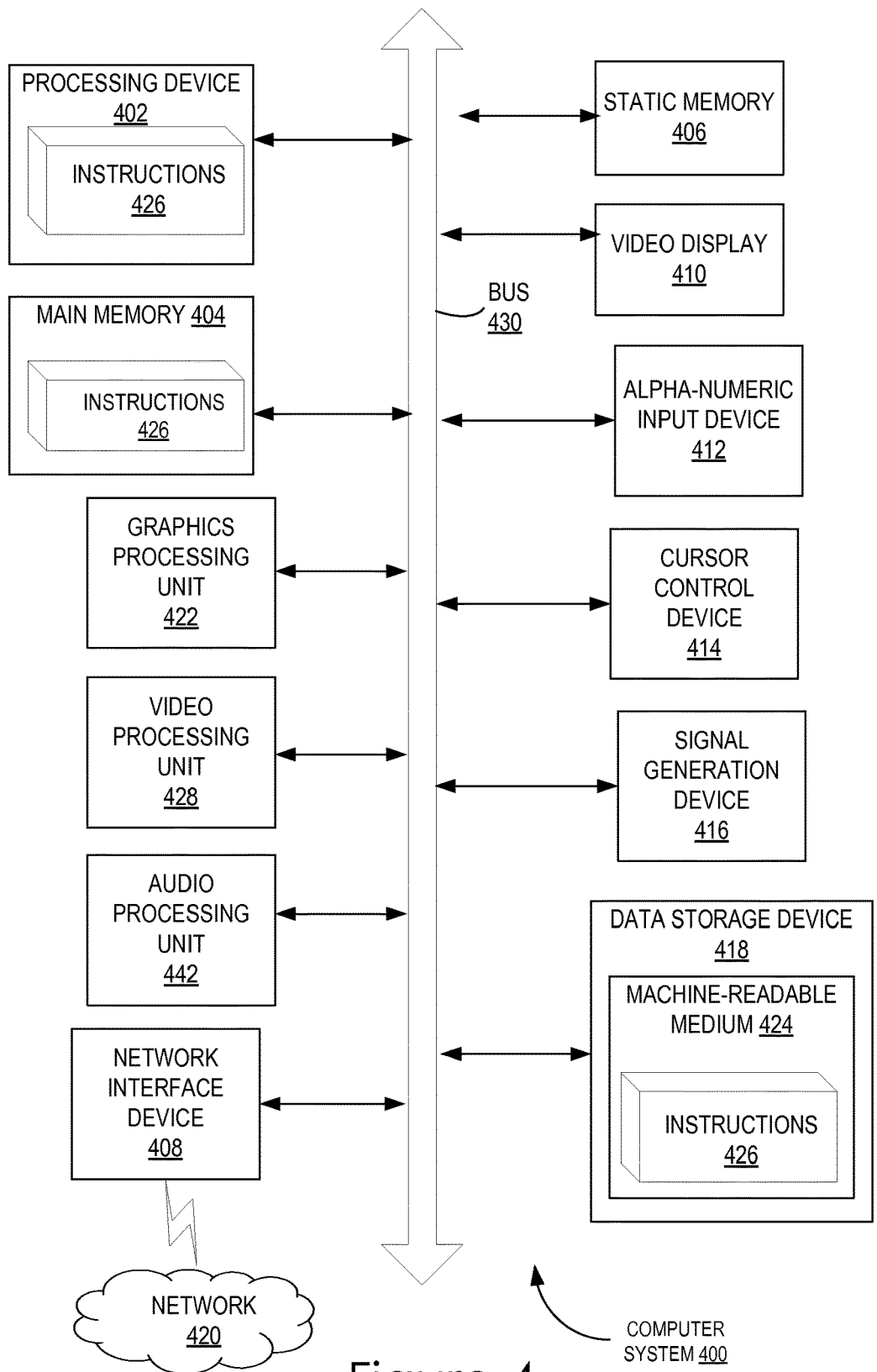
FIG. 4 illustrates a diagrammatic representation of a machine in the exemplary form of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the agent 126A-126C or VMM 124A-124C (as discussed in conjunction with FIG. 1) may be included in the execution block processing device 402.

The computer system 400 includes a processing device 402, a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. In one embodiment, processing device 402 may include one or processing cores. The processing device 402 is configured to execute the instructions 426 of processing logic for performing the operations discussed herein.

The computer system 400 may further include a network interface device 408 communicably coupled to a network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a signal generation device 416 (e.g., a speaker), or other peripheral devices. Furthermore, computer system 400 may include a graphics processing unit 422, a video processing unit 428, and an audio processing unit 432. In another embodiment, the computer system 400 may include a chipset (not illustrated), which refers to a group of integrated circuits, or chips, that are designed to work with the processing device 402 and controls communications between the processing device 402 and external devices. For example, the chipset may be a set of chips on a motherboard that links the processing device 402 to very high-speed devices, such as main memory 404 and graphic controllers, as well as linking the processing device 402 to lower-speed peripheral buses of peripherals, such as USB, PCI or ISA buses.

The data storage device 418 may include a computer-readable storage medium 424 on which is stored instructions 426 embodying any one or more of the methodologies of functions described herein. The instructions 426 may also reside, completely or at least partially, within the main memory 404 and/or within the processing device 402 during execution thereof by the computer system 400; the main memory 404 and the processing device 402 also constituting computer-readable storage media.

The computer-readable storage medium 424 may also be used to store instructions 426 utilized by the host 120A-120C, such as described with respect to FIG. 1, and/or a software library containing methods that call the above applications. While the computer-readable storage medium 424 is shown in an example embodiment to be a single medium, the term "computer-readable storage medium" or, simply, "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "forwarding", "provisioning", "creating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of any future presented claims. Accordingly, the specification and drawings are to be regarded in an illustrative sense rather than a restrictive sense. The scope of the invention should, therefore, be determined with reference to any future claims, along with the full scope of equivalents to which such claims are entitled.

What is claimed is:

1. A method comprising:
    sending, by a processing device, a first ping to a first storage domain;
    determining whether a first response to the first ping has been received from the first storage domain within a first amount of time;
    in response to determining that the first response to the first ping has not been received from the first storage domain within the first amount of time, determining that the first storage domain is inaccessible;
    pausing a subset of a set of virtual machines in response to determining that the first storage domain is inaccessible;
    recording that the subset of the set of virtual machines has been paused in response to determining that the first storage domain is inaccessible;
    sending a second ping to the first storage domain;
    determining whether a second response to the second ping has been received from the first storage domain within a second amount of time, wherein the second amount of time is different than the first amount of time;
    in response to determining that the second response to the second ping has been received from the first storage domain within the second amount of time, determining that the first storage domain is accessible;
    determining, by the processing device, the set of virtual machines that are paused and are associated with the first storage domain;
    determining the subset of the set of virtual machines that are not associated with a second inaccessible storage domain;
    determining whether each of the subset of the set of virtual machines was paused in response to the first storage domain being inaccessible; and
    resuming each of the subset of the set of virtual machines that were paused in response to the first storage domain being inaccessible.

2. The method of claim 1, wherein determining the set of virtual machines comprises:
    determining one or more virtual machines that are paused; and
    determining which of the one or more virtual machines that are paused are associated with the first storage domain.

3. The method of claim 1, wherein determining the set of virtual machines comprises:
    determining one or more virtual machines that are associated with the first storage domain; and
    determining which of the one or more virtual machines that are associated with the first storage domain are paused.

4. The method of claim 1, wherein resuming the subset of the set of virtual machines comprises:
    determining, for a virtual machine of the set of virtual machines, whether to resume the virtual machine; and
    resuming the determined virtual machine of the set of virtual machines.

5. The method of claim 4, wherein determining whether to resume the subset of the set of virtual machines comprises determining a reason why the virtual machine was paused.

6. The method of claim 4, where determining whether to resume the subset of the set of virtual machines comprises determining whether all storage domains that the virtual machine is associated with are available.

7. The method of claim 1, wherein the subset of the set of virtual machines is resumed without user interaction.

8. A non-transitory computer-readable medium having instructions encoded thereon which, when executed by a processing device, cause the processing device to:
    send a first ping to a first storage domain;
    determine whether a first response to the first ping has been received from the first storage domain within a first amount of time;
    in response to determining that the first response to the first ping has not been received from the first storage domain within the first amount of time, determine that the first storage domain is inaccessible;
    pause a subset of a set of virtual machines in response to the determination that the first storage domain is inaccessible; and
    record that the subset of the set of virtual machines has been paused in response to the determination that the first storage domain is inaccessible;
    send a second ping to the first storage domain;
    determine whether a second response to the second ping has been received from the first storage domain within a second amount of time, wherein the second amount of time is different than the first amount of time;
    in response to determining that the second response to the second ping has been received from the first storage domain within the second amount of time, determine that the first storage domain is accessible;
    determine, by the processing device, the set of virtual machines that are paused and are associated with the first storage domain;
    determine, the subset of the set of virtual machines that are not associated with a second inaccessible storage domain;
    determine whether each of the subset of the set of virtual machines was paused in response to the first storage domain being inaccessible; and
    resume each of the subset of the set of virtual machines that were paused in response to the first storage domain being inaccessible.

9. The non-transitory computer-readable medium of claim 8, wherein to resume the subset of the set of virtual machines, the processing device further to:
    determine, for a virtual machine of the set of virtual machines, whether to resume the virtual machine; and
    resume the determined virtual machine of the set of virtual machines.

10. An apparatus comprising:
    a memory; and
    a processing device, operatively coupled to the memory, the processing device to:
        send a first ping to a first storage domain;
        determine whether a first response to the first ping has been received from the first storage domain within a first amount of time;
        in response to determining that the first response to the first ping has not been received from the first storage domain within the first amount of time, determine that the first storage domain is inaccessible;
        pause at least one of a set of virtual machines in response to the determination that the first storage domain is inaccessible; and
        record that the at least one of the set of virtual machines has been paused in response to the determination that the first storage domain is inaccessible;
        send a second ping to the first storage domain;
        determine whether a second response to the second ping has been received from the first storage domain within a second amount of time, wherein the second amount of time is different than the first amount of time;
        in response to determining that the second response to the second ping has been received from the first storage domain within the second amount of time, determine that the first storage domain is accessible;
        determine, by the processing device, the set of virtual machines that are paused and are associated with the first storage domain;
        determine, the subset of the set of virtual machines that are not associated with a second inaccessible storage domain;
        determine whether each of the subset of the set of virtual machines was paused in response to the first storage domain being inaccessible; and
        resume each of the subset of the set of virtual machines that were paused in response to the first storage domain being inaccessible.

11. The apparatus of claim 10, wherein to determine the set of virtual machines, the processing device is to:
    determine one or more virtual machines that are paused and determine which of the one or more virtual machines that are paused are associated with the first storage domain; or
    determine one or more virtual machines that are associated with the first storage domain and determine which of the one or more virtual machines that associated with the first storage domain are paused.

12. The apparatus of claim 11, wherein the subset of the set of virtual machines is resumed without user interaction.

13. The apparatus of claim 10, wherein to resume the subset of the set of virtual machines, the processing device is to:
    determine, for a virtual machine of the set of virtual machines, whether to resume the virtual machine; and
    resume the determined virtual machine of the set of virtual machines.

14. The apparatus of claim 13, wherein to determine whether to resume the virtual machine, the processing device further to:
    determine a reason why the virtual machine was paused or determine whether to resume the virtual machine; or
    determine whether all storage domains that the virtual machine is associated with are available.

* * * * *